United States Patent [19]

Hayes

[11] Patent Number: 4,885,936
[45] Date of Patent: Dec. 12, 1989

[54] AUTOMATIC LOADWHEEL CLEANER

[75] Inventor: Richard H. Hayes, Talmadge, Ohio

[73] Assignee: Eagle-Picher Industries, Inc., Cincinnati, Ohio

[21] Appl. No.: 248,978

[22] Filed: Sep. 26, 1988

[51] Int. Cl.$^4$ ............................................. E01C 23/00
[52] U.S. Cl. ...................................... 73/146; 15/21 D
[58] Field of Search .................. 73/146, 7, 8; 15/21 D, 15/21 E, 22 C, 53 R, 53 B, 104.09, 104.2, 181; 157/14, 20

[56] References Cited

U.S. PATENT DOCUMENTS

| | | | |
|---|---|---|---|
| 2,010,049 | 8/1935 | Abbott, Jr. et al. | 73/8 |
| 3,025,546 | 3/1962 | Nagele | 15/21 D |
| 3,928,884 | 12/1975 | Sutter | 15/21 D |
| 4,532,665 | 8/1985 | Evans et al. | 15/21 D |

Primary Examiner—Joseph A. Orsino
Assistant Examiner—Brent A. Swarthout
Attorney, Agent, or Firm—Wood, Herron & Evans

[57] ABSTRACT

In a tire testing machine, a loadwheel is repeatedly engaged by a tire. Rubber from the tire is embedded in the grit on the surface of the loadwheel. A rotating brush is moved against the loadwheel, engaging the rotating loadwheel between testing operations to maintain the loadwheel substantially free of rubber.

4 Claims, 1 Drawing Sheet

AUTOMATIC LOADWHEEL CLEANER

BACKGROUND OF THE INVENTION

This invention relates to a tire testing machine having a loadwheel and, more particularly, the invention is directed to apparatus for cleaning the loadwheel.

In a tire testing machine, such as a tire uniformity machine, a tire and a large diameter loadwheel are brought together with the tire usually driving the loadwheel. Variations in the spin of the loadwheel are measured to determine the characteristics of the tire. It is important to have a perfectly cylindrical loadwheel and to drive the loadwheel without slip between the tire and loadwheel, for if the loadwheel is slightly out of round, or if the tire slips with respect to the loadwheel, those imperfections will be reflected in the determination of the uniformity of the tire, producing inaccurate results.

The prior practice has been to wrap the cylindrical surface of the loadwheel with a stair tread paper, that is, an anti-slip paper having grit in its surface. When the grit surface has become clogged with rubber from the repeated testing operations, the paper is then removed and replaced with fresh stair tread paper.

Unfortunately, the character of the stair tread paper has varied so that it is no longer suitable for tire testing machines. It has been replaced by coating the loadwheel surface with a grit-carrying substance resulting in a grit-roughened surface on the loadwheel.

In the course of repeated testing operations, the grit becomes clogged with rubber. The current practice has been to clean the wheel periodically, sometimes as often as every day, with a solvent and brush.

SUMMARY OF THE INVENTION

An objective of the present invention has been to provide for the automatic cleaning of the loadwheel following each testing operation or at prescribed intervals such as after every fifth testing operation.

This objective of the invention has been attained by pivotally mounting a rotating wire brush adjacent the loadwheel. A spring urges the brush toward the loadwheel between testing operations so that when it contacts the loadwheel, a firm pressure is produced without substantial bending of the brush bristles. An air cylinder is provided to retract the brush against the force of the spring during testing operations. Preferably, the signal that brings the tire into contact with the loadwheel is the same signal that operates the air cylinder to retract the brush from the loadwheel.

BRIEF DESCRIPTION OF THE DRAWINGS

The several features and objectives of the invention will become more readily apparent from the following detailed description taken in conjunction with the accompanying drawings.

DESCRIPTION OF THE PREFERRED EMBODIMENT

Figure 1:
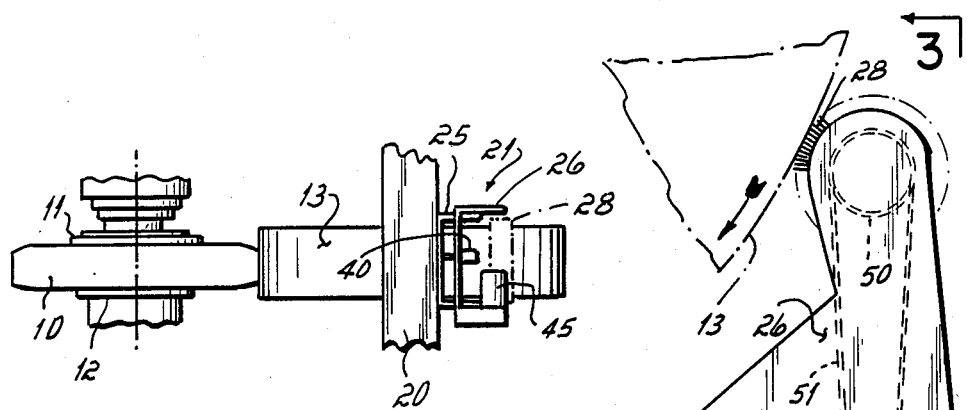
FIG. 1 is a diagrammatic elevational view of a portion of a tire testing machine utilizing the present invention.

Referring to FIG. 1, a tire 10 is mounted between an upper chuck 11 and a lower chuck 12 of the tire uniformity machine. An inflation system, not shown, is provided for introducing air through the upper chuck 11 to inflate the tire before the testing operation. A loadwheel 13 is mounted alongside the tire and is adapted to be moved into engagement with the tire with each testing operation. The loadwheel drives the tire. Variations in its rotation are measured and reflect the lack of uniformity of the tire. The apparatus for operating the loadwheel is more completely disclosed in U.S. Pat. No. 4,404,848 whose disclosure is fully incorporated herein by reference.

Figure 2:
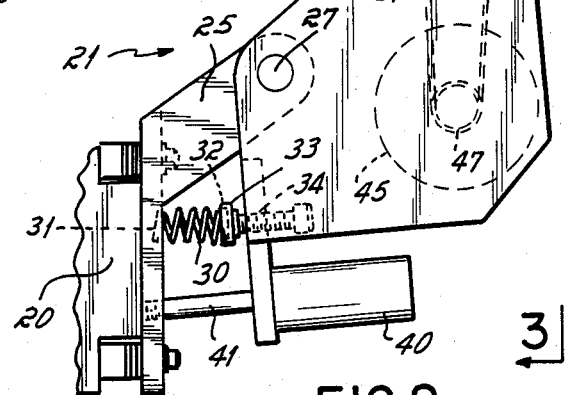
FIG. 2 is a fragmentary plan view of the loadwheel brush.
Figure 3:
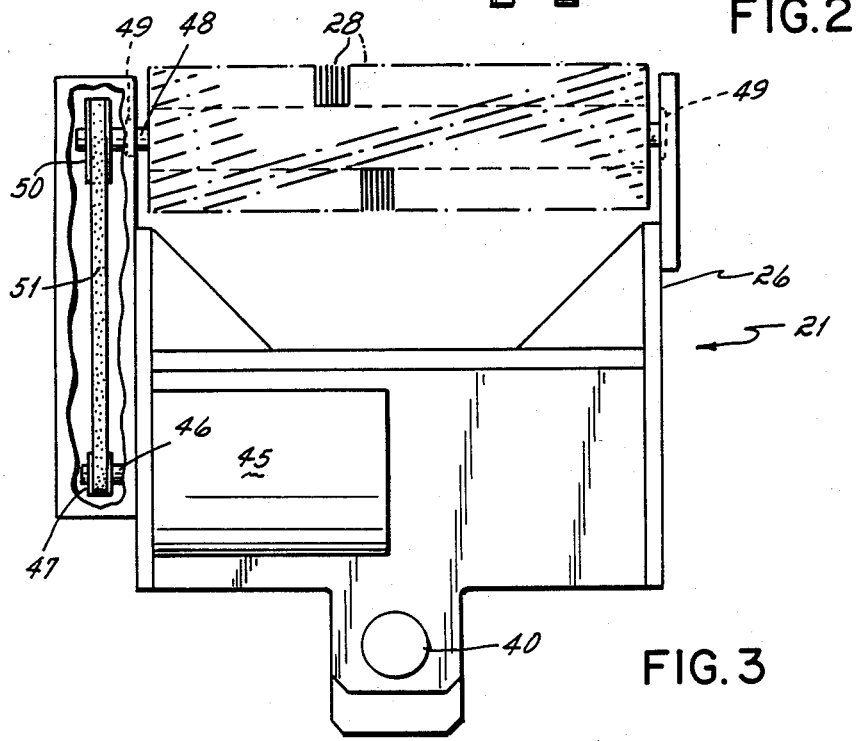
FIG. 3 is an elevational view taken in the direction of lines 3—3 of FIG. 2 showing the brush and motor drive.

The loadwheel is mounted on a frame 20 which is movable with the loadwheel toward and away from the tire 10. The loadwheel cleaner 21 is shown mounted on the frame 20. Referring to FIGS. 2 and 3, the loadwheel cleaner includes a bracket 25 mounted on the frame 20. A brush carrier 26 is pivotally mounted about a spindle 27 on the bracket 25. A brush 28 of brass bristles spirally mounted on a roll is rotatably mounted on the end of the carrier 26. A compression spring 30 has one end 31 fixed to the frame 20 and the other end 32 seated in a cup 33 mounted on the end of an adjustable screw 34. The screw 34 is threaded into the brush carrier so that the pressure on the spring 30 can be varied.

The brush is about twelve inches long and about three and one-half inches in diameter. The brass bristles are about 0.006 inch thick.

An air cylinder 40 is mounted on the carrier. The air cylinder has a piston and piston rod 41 projecting from the cylinder. The piston rod is connected to the frame 20 so that actuation of the air cylinder causes the piston rod 41 to retract, thereby pivoting the brush carrier clockwise as viewed in FIG. 2, thereby bringing the brush 28 away from the loadwheel 13. When air pressure is relieved, spring 30 returns the brush to the loadwheel.

A motor 45 is mounted on the carrier 26. The motor has a shaft 46 to which a pulley 47 is mounted. The brush 28 is mounted on a shaft 48 which is mounted by bearings 49 in the carrier 28. The shaft has a pulley 50 aligned with the pulley 47. A belt 51 connects the motor pulley 47 with the brush pulley 50 so that upon operation of the motor the brush will rotate. Rotation is in the same direction as the loadwheel so that the loadwheel, free wheeling at about 30 rpm during the cleaning operation, is urged, by the faster motion of the bristles, to keep rotating.

The pressure of spring 30 is preferably adjusted to cause the wire bristles of the brush 28 to firmly engage the loadwheel 13. Preferably, the pressure is great enough that the bristles are flexed, at most, only slightly so that as the bristles rotate and engage the rubber particles lodged between the elements of grit on the loadwheel, the rubber particles will be flicked off the wheel, thereby cleaning the wheel.

In operation, when a signal is generated to cause the loadwheel to move against the tire, that signal will operate a valve to the air cylinder 40 causing the air cylinder to retract, thereby pulling the brush away from the loadwheel. The loadwheel drives the tire during the testing of the uniformity of the tire. At the conclusion of the test, a signal causes the loadwheel to back away from the tire. The same signal relieves the pressure to the air cylinder, whereupon the spring 30 pivots the brush carrier counterclockwise to bring the brush bristles into contact with the surface of the loadwheel. The inertia of the loadwheel keeps the loadwheel turning.

That speed of rotation will be less than 60 rpm--about 30 rpm. The brush is rotated in the same direction as the loadwheel with a peripheral speed greater than that of the loadwheel, thereby tending to keep the loadwheel turning. The surface speed of the brush is significantly faster than that of the loadwheel so that the bristles will brush against the loadwheel cleaning the rubber out from the grit particles. As the brush wears, the spring pulls the brush closer to the loadwheel, whereby the cleaner automatically compensates for wear.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. In a tire testing machine having a frame, a rotating loadwheel mounted on said frame, and having a wide surface against which tires are repeatedly pressed to simulate road conditions,
   a loadwheel cleaner comprising,
   a bracket mounted on said frame adjacent said loadwheel,
   a brush carrier pivotally mounted on said bracket,
   a wire brush rotatably mounted on said carrier adjacent said loadwheel,
   a motor mounted on said carrier and connected to said brush to rotate said brush,
   a spring between said carrier and frame urging said brush into engagement with said wheel,
   and a piston and cylinder connected between said carrier and frame to move said brush away from said loadwheel.

2. In a tire testing machine having a rotating loadwheel having a wide surface against which tires are repeatedly pressed to simulate road conditions,
   a loadwheel cleaner comprising,
   a cylindrical wire brush having wire bristles,
   a spring for urging said brush against said loadwheel surface,
   said spring applying sufficient pressure of said brush against said loadwheel to maintain said brush against said loadwheel without significantly bending bristles of said brush, whereby said brush will be held against said loadwheel notwithstanding wear on said brush,
   and means for rotating said brush.

3. In a tire testing machine having a rotating loadwheel having a wide surface against which tires are repeatedly pressed and rotated to rotate said loadwheel to simulate road conditions, a loadwheel cleaner comprising,
   a cylindrical wire brush having wire bristles,
   means for moving said brush into engagement with said loadwheel when a tire is disengaged from said loadwheel,
   means for rotating said brush in a direction and at a speed to cause said bristles to move past the surface of the loadwheel in the same direction as the surface of loadwheel moves and at a speed greater than that of the surface of the loadwheel to clean the loadwheel while urging it in its direction of rotation.

4. In a tire testing machine having a loadwheel against which tires are repeatedly pressed and rotated to simulate road conditions, the method of cleaning rubber from the surface of the loadwheel comprising the steps of,
   disengaging the tire from the loadwheel,
   brushing the surface of the loadwheel in the same direction as the surface of the loadwheel is moving but at a speed faster than the surface of the loadwheel is moving to assist in continuing the rotation of the loadwheel,
   and pressing a tire against said loadwheel while discontinuing said brushing step, whereby said brushing step does not interfere with the testing of tires while a tire is pressed against said loadwheel.

* * * * *